(12) United States Patent
Tomita et al.

(10) Patent No.: US 12,688,484 B2
(45) Date of Patent: Jul. 21, 2026

(54) PRODUCT MANAGEMENT APPARATUS, PRODUCT MANAGEMENT METHOD, AND NON-TRANSITORY STORAGE MEDIUM

(71) Applicant: NEC Corporation, Tokyo (JP)

(72) Inventors: Rina Tomita, Tokyo (JP); Yuji Tahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 266 days.

(21) Appl. No.: 18/274,173

(22) PCT Filed: Jun. 30, 2021

(86) PCT No.: PCT/JP2021/024780
§ 371 (c)(1),
(2) Date: Jul. 25, 2023

(87) PCT Pub. No.: WO2023/276052
PCT Pub. Date: Jan. 5, 2023

(65) Prior Publication Data
US 2024/0095665 A1 Mar. 21, 2024

(51) Int. Cl.
G06Q 10/087 (2023.01)

(52) U.S. Cl.
CPC .................................. G06Q 10/087 (2013.01)

(58) Field of Classification Search
None
See application file for complete search history.

(56) References Cited

U.S. PATENT DOCUMENTS

| | | | | |
|---|---|---|---|---|
| 4,816,824 A * | 3/1989 | Katz | ........................ | G07D 7/12 340/5.86 |
| 5,151,684 A * | 9/1992 | Johnsen | ............. | G08B 13/2431 340/568.4 |
| 6,337,836 B1 * | 1/2002 | Eidelson | ................. | G04F 1/005 705/28 |
| 6,557,760 B2 * | 5/2003 | Goodwin, III | ......... | G06Q 30/06 235/383 |
| 8,738,417 B2 * | 5/2014 | Drew | ..................... | G06Q 40/00 705/7.29 |

(Continued)

FOREIGN PATENT DOCUMENTS

| | | | | | |
|---|---|---|---|---|---|
| EP | | 1154359 A1 * | 11/2001 | ........... | G06Q 10/087 |
| JP | 2002-024350 A | | 1/2002 | | |

(Continued)

OTHER PUBLICATIONS

International Search Report for PCT Application No. PCT/JP2021/024780, mailed on Sep. 21, 2021.

*Primary Examiner* — Fateh M Obaid

(74) *Attorney, Agent, or Firm* — Sughrue Mion, PLLC

(57) ABSTRACT

The acquisition unit (110) acquires target period information that can determine a first period. The first period is a period being a setting target of a preparation plan of a product cooked at a target store. The screen display unit (120) displays a first screen on a display. The first screen includes an input field of a preparation number of the product by a plurality of kinds of the products. Then, an arrangement order of the input field associated with each of the two or more products described above on the first screen is the same as an arrangement order of the two or more products described above on the display shelf.

8 Claims, 9 Drawing Sheets

(56)                    References Cited

U.S. PATENT DOCUMENTS

| | | | | |
|---|---|---|---|---|
| 2002/0143672 | A1 * | 10/2002 | Sawasaki | G06Q 10/087 705/29 |
| 2003/0182193 | A1 * | 9/2003 | Kawamata | G06Q 10/087 705/16 |
| 2006/0271447 | A1 * | 11/2006 | Leon | G06Q 30/0601 705/27.1 |
| 2007/0265943 | A1 * | 11/2007 | Kuwabara | G06Q 10/08 705/29 |
| 2018/0211205 | A1 * | 7/2018 | Takemoto | G06Q 10/087 |
| 2019/0279145 | A1 * | 9/2019 | Nakano | G06Q 30/02 |
| 2020/0327562 | A1 * | 10/2020 | Tanazawa | G07F 9/026 |
| 2023/0063863 | A1 * | 3/2023 | Furukawa | G06Q 30/06 |

FOREIGN PATENT DOCUMENTS

| | | | | |
|---|---|---|---|---|
| JP | 2020-119277 A | 8/2020 | | |
| JP | 2021-034064 A | 3/2021 | | |
| WO | WO-2004095208 A2 * | 11/2004 | | G06Q 30/0641 |

* cited by examiner

PRODUCT MANAGEMENT APPARATUS, PRODUCT MANAGEMENT METHOD, AND NON-TRANSITORY STORAGE MEDIUM

This application is a National Stage Entry of PCT/JP2021/024780 filed on Jun. 30, 2021, the contents of all of which are incorporated herein by reference, in their entirety.

TECHNICAL FIELD

The present invention relates to a product management apparatus, a product management method, and a program.

BACKGROUND ART

In recent years, selling a product cooked at a store has been increasing. For such a product, a time since the product is cooked until the product is disposed of is determined. Thus, a preparation number of the product needs to be determined by time period in advance.

Note that, Patent Document 1 describes that shelf allocation of a display shelf of a product is managed by data, and a position of the product on the display shelf is displayed on a change screen of the shelf allocation.

Further, Patent Document 2 describes that a retail store management system displays a sales plan and past sales performance on a screen.

RELATED DOCUMENT

Patent Document

Patent Document 1: Japanese Patent Application Publication No. 2021-034064

Patent Document 2: Japanese Patent Application Publication No. 2002-024350

DISCLOSURE OF THE INVENTION

Technical Problem

As described above, when a product cooked at a store is to be on sale, a preparation number of the product needs to be determined by time period in advance. Meanwhile, in recent years, since internationalization of a salesclerk has been advancing, there is a possibility that a salesclerk makes a mistake in a product being a target when the salesclerk performs work related to a preparation number of the product. One example of an object of the present invention is to reduce a possibility that a salesclerk makes a mistake in a product being a target when the salesclerk performs work related to a preparation number of the product.

Solution to Problem

The present invention provides a product management apparatus including:
an acquisition unit that acquires target period information that can determine a first period being a setting target of a preparation plan of a product cooked at a target store;
a screen display unit that displays, on a display, a first screen including an input field of a preparation number of the product by a plurality of kinds of the products; and
a storage processing unit that stores, in a storage unit, a numerical value input to the input field, in association with a combination of the product associated with the input field and a period indicated by the target period information, wherein
two or more of the products are displayed on one display shelf in the target store, and
an arrangement order of the input field associated with each of the two or more products on the first screen is a same as an arrangement order of the two or more products on the display shelf.

The present invention provides a product management apparatus including:
an acquisition unit that acquires information indicating a preparation number of each of a plurality of kinds of products cooked at a target store; and
a screen display unit that displays, on a display, a screen including a display field of a preparation number of the product by the plurality of kinds of products, wherein
two or more of the products are displayed on one display shelf in the target store, and
an arrangement order of the input field associated with each of the two or more products on the screen is a same as an arrangement order of the two or more products on the display shelf.

Further, the present invention provides a product management method using the product management apparatus described above, and a program that achieves the product management apparatus described above by using a computer.

Advantageous Effects of Invention

Further, according to the present invention, a possibility that a salesclerk makes a mistake in a product being a target when the salesclerk performs work related to a preparation number of the product is reduced.

BRIEF DESCRIPTION OF THE DRAWINGS

The above-described object, the other objects, features, and advantages will become more apparent from suitable example embodiments described below and the following accompanying drawings.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

Figure 1:
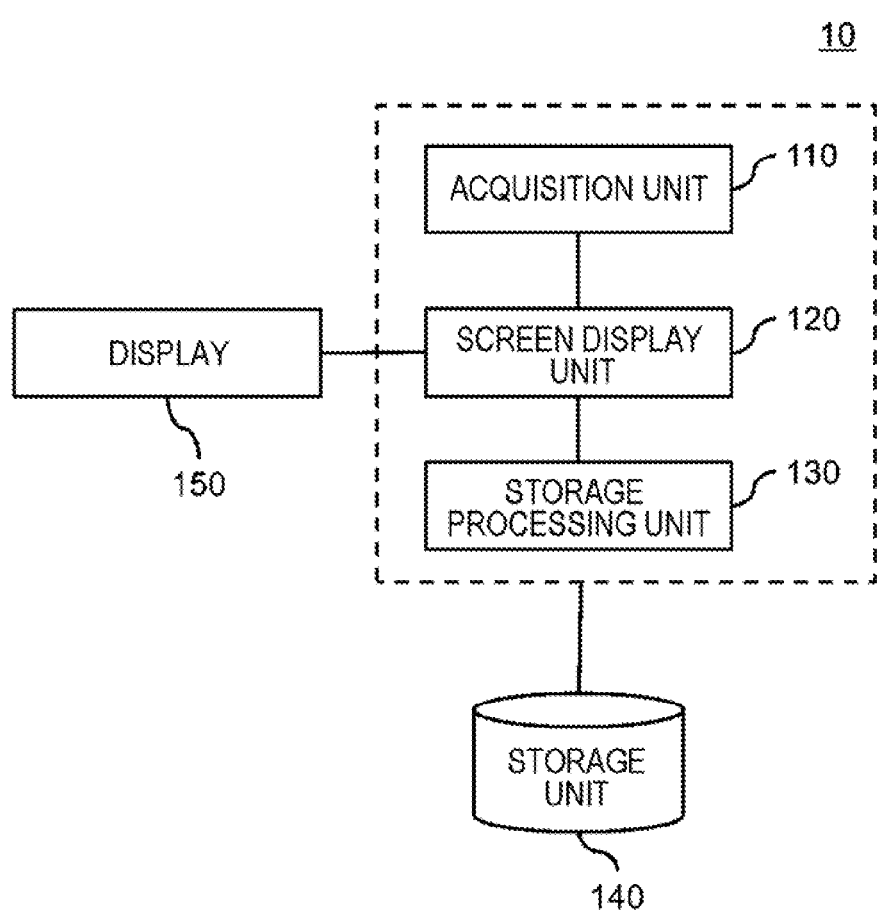
FIG. 1 It is a diagram illustrating a configuration of a product management apparatus according to an example embodiment.

FIG. 1 is a diagram illustrating a configuration of a product management apparatus 10 according to an example embodiment. The product management apparatus 10 is an apparatus that manages a preparation plan of a product cooked at a store, and is installed in, for example, a store (hereinafter, described as a target store) being a setting target of the preparation plan. For a product cooked at a store, a time since the product is cooked until the product is disposed of is determined. Thus, a salesclerk needs to cook a product for a plurality of times during a day. The preparation plan includes the number of cooking times by time period in each month and day. When there are a plurality of kinds of products cooked in the store, the preparation plan is set by the kinds. Then, two or more products are displayed on one display shelf. This display shelf may often have a function of keeping warmth.

The product management apparatus 10 includes an acquisition unit 110, a screen display unit 120, and a storage processing unit 130. The product management apparatus 10 is used together with a storage unit 140 and a display 150. In the example illustrated in FIG. 1, the storage unit 140 and the display 150 are a part of the product management apparatus 10, but at least one of the storage unit 140 and the display 150 may be provided outside the product management apparatus 10. The storage unit 140 stores various types of information (for example, data about a screen displayed on the display 150) needed for processing performed by the product management apparatus 10.

The acquisition unit 110 acquires information (hereinafter, described as target period information) that can determine a first period being a setting target of a preparation plan. For example, a salesclerk at a target store inputs first period information to the product management apparatus 10. Then, the acquisition unit 110 acquires this first period information. The first period information may include a month and day (furthermore, a time period), or may have an attribute instead of this. The attribute includes at least one of a day of a week, whether it is a holiday, presence or absence of a sale at the target store, and presence or absence of an event around the target store. When the first period information is the attribute, the preparation plan may be a plan common to a period (for example, a day) having the attribute, and may indicate a default value of a preparation number in a period of the attribute.

The screen display unit 120 displays a first screen on the display 150. The first screen includes an input field of a preparation number of a product by the product of a plurality of kinds. As described above, two or more products are displayed on one display shelf. Then, on the first screen, an arrangement order of the input field associated with each of the two or more products is the same as an arrangement order of the two or more products on the display shelf. In this way, a salesclerk is less likely to make a mistake in a product being a target of the input field. Note that, a specific example of the first screen will be described below by using another diagram.

The storage processing unit 130 stores, in the storage unit 140, a numerical value input to the input field, in association with a combination of the product associated with the input field and a period indicated by the target period information. In this way, at least a part of the preparation plan is stored in the storage unit 140.

Subsequently, a salesclerk in charge of cooking at a target store displays the preparation plan being stored in the storage unit 140 on the display 150, and confirms a preparation number of a product in that time period on that day.

Note that, the product management apparatus 10 may be a server installed outside the target store. In this case, the product management apparatus 10 manages a preparation plan of a plurality of target stores. Then, the display 150, and an input device operated by a salesclerk are installed in each of the plurality of target stores.

Figure 2:
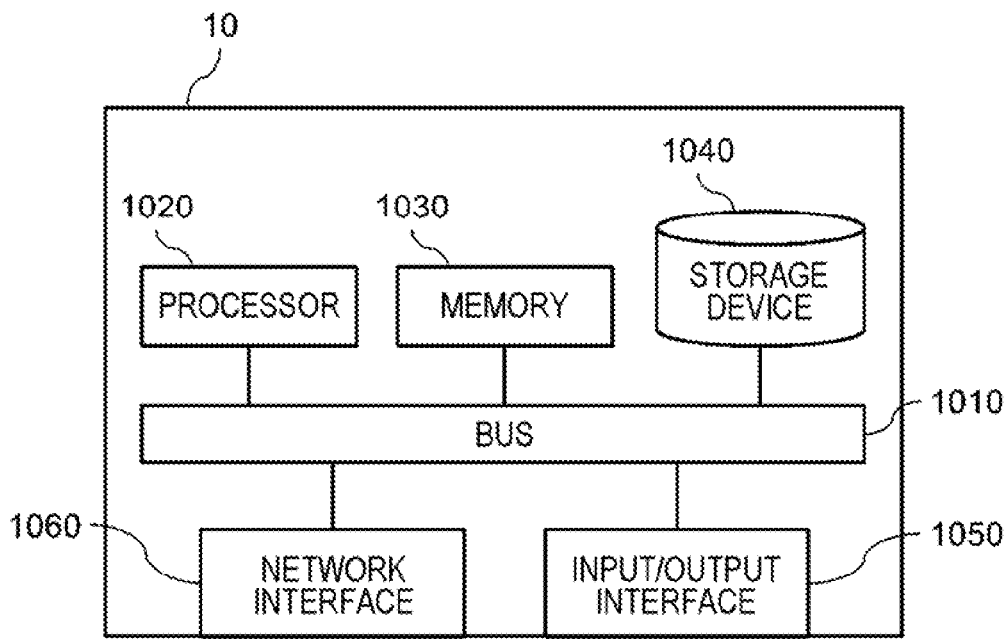
FIG. 2 It is a diagram illustrating a hardware configuration example of the product management apparatus.

FIG. 2 is a diagram illustrating a hardware configuration example of the product management apparatus 10. The product management apparatus 10 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method for connecting the processor 1020 and the like to one another is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (for example, the acquisition unit 110, the screen display unit 120, and the storage processing unit 130) of the product management apparatus 10. The processor 1020 reads each program module onto the memory 1030 and executes the program module, and each function associated with the program module is achieved. Further, the storage device 1040 also functions as the storage unit 140.

The input/output interface 1050 is an interface for connecting the product management apparatus 10 and various types of input/output equipment.

The network interface 1060 is an interface for connecting the product management apparatus 10 to a network. The network is, for example, a local area network (LAN) and a wide area network (WAN). A method of connection to the network by the network interface 1060 may be wireless connection or wired connection.

Figure 3:
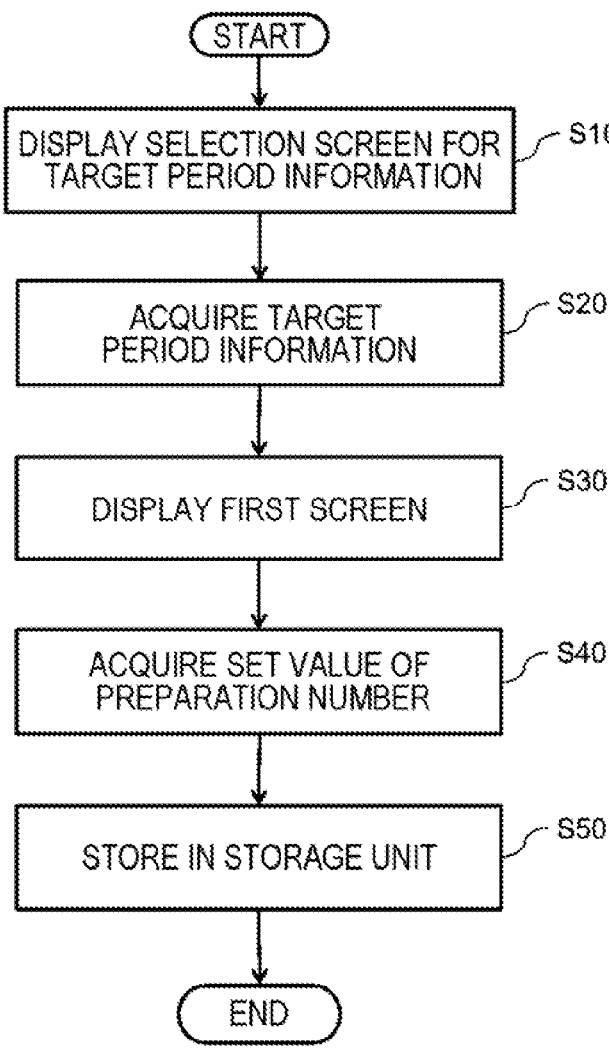
FIG. 3 It is a flowchart illustrating a first example of processing performed by the product management apparatus.

FIG. 3 is a flowchart illustrating a first example of processing performed by the product management apparatus 10. First, the product management apparatus 10 displays an initial screen on the display 150. This initial screen includes a region for inputting or selecting target period information (step S10). A salesclerk at a target store inputs or selects the target period information in this initial screen. Then, the acquisition unit 110 of the product management apparatus 10 acquires the target period information (step S20).

Next, the screen display unit 120 displays the first screen (step S30). The salesclerk inputs a preparation number of a product by plurality of products to this first screen. The storage processing unit 130 acquires the preparation number by the products being input herein (step S40), and stores, in the storage unit 140, the preparation number by the products in association with the target period information acquired by the acquisition unit 110 (step S50). For example, when the target period information indicates a month and day, the storage processing unit 130 stores the preparation number by the products in association with the month and day. On the other hand, when the target period information indicates an attribute (for example, at least one of a day of a week, whether it is a holiday, presence or absence of a sale at the target store, and presence or absence of an event around the target store), the preparation number by the products is stored in association with the attribute.

Note that, when the target period information indicates the attribute, as described above, the preparation number being stored herein may be handled as a default value of the preparation number in the period of the attribute. In this case, after setting of this default value is performed, the processing illustrated in FIG. 3 is performed again. Then, at that time, when a target period indicates a month and day, the screen display unit 120 displays, as a default value, the preparation number being stored in association with an attribute of the month and day in the storage unit 140 on the first screen.

Figure 4:
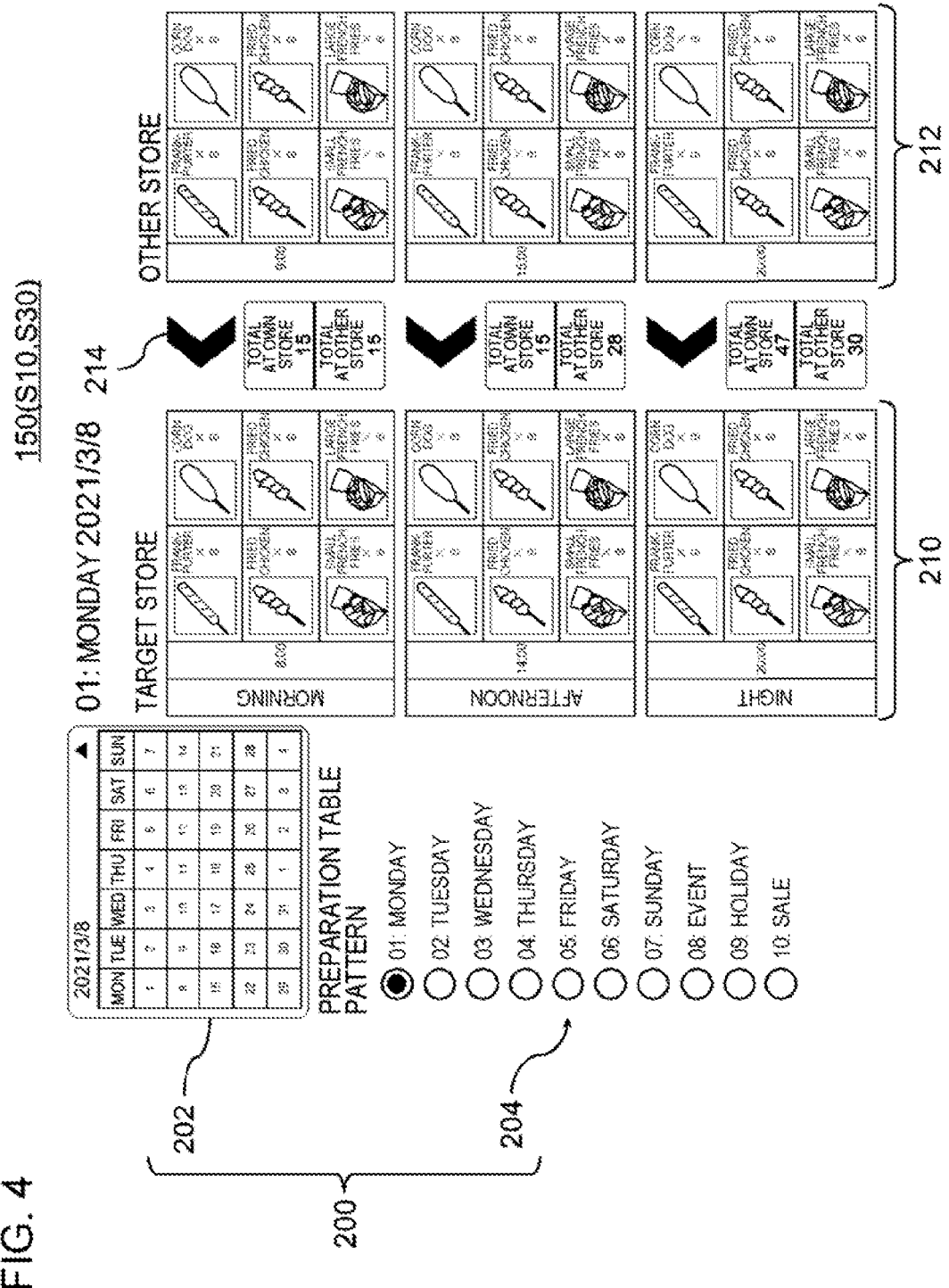
FIG. 4 It is a diagram illustrating a first example of a first screen displayed by a display in step S30 in FIG. 3.

FIG. 4 is a diagram illustrating a first example of the first screen displayed on the display 150 in step S30 in FIG. 3. In the example illustrated in FIG. 4, the first screen also functions as the initial screen, and includes a period selection field 200 for selecting target period information. The period selection field 200 includes a month-day selection field 202 for selecting a month and day, and an attribute selection field 204 for selecting an attribute. Note that, when a salesclerk selects a month and day in the month-day selection field 202, an attribute associated with the month and day is automatically selected in the attribute selection field 204.

Further, the first screen includes a plan input field 210 for inputting a preparation plan at a target store. In the plan input field 210, the preparation plan can be input in a unit of days. Specifically, in the plan input field 210, one day is divided into a plurality of time periods, and an input field of a preparation number is provided by the plurality of time periods for each of the plurality of products. Then, in each of the time periods, an arrangement order of the input fields of the plurality of products coincides with an arrangement order of the plurality of products on a display shelf Thus, a salesclerk can easily determine a product associated with each of the input fields. Therefore, a possibility that the salesclerk makes a mistake in a product being an input target is reduced. Note that, the display shelf associated with the example illustrated in FIG. 4 is not illustrated, but includes three shelves, and a plurality of products are displayed on each of the shelves. Then, also in the plan input field 210, input fields of the plurality of products are divided into three rows, and, in each of the rows, the input fields of the plurality of products associated with the row are provided.

Further, on the first screen, each of the plurality of input fields includes at least one of an image, a picture, and a mark of a product associated with the input field in addition to a product name of the product. In this way, even when a salesclerk is not conversant in a language being used for the product name, the salesclerk can easily determine the product associated with the input field. Therefore, a possibility that the salesclerk makes a mistake in a product being an input target is further reduced.

Further, the first screen illustrated in FIG. 4 includes a recommended value of a preparation number of at least one product. As one example, this recommended value is based on a performance value of a preparation number of a product at a store (hereinafter, described as another store) different from the target store. The another store is a store whose location condition is close to that of the target store, and whose sales of a product cooked in the store is equal to or greater than a reference. The location condition is, for example, 1) a name of a nearest station and a distance from the station, 2) an environment (a residential street, a busy street, a commercial region, and presence or absence of a predetermined facility (a school and a company)) around a store, 3) a passage amount of at least one of a pedestrian and a vehicle on a road around a store, and the like.

Then, a recommended value display field 212 of a preparation number is the same as the input field of the target store. Specifically, in the recommended value display field 212, one day is divided into a plurality of time periods, and an input field of a preparation number is provided by the plurality of time periods for each of the plurality of products. Then, in each of the time periods, an arrangement order of the input fields of the plurality of products coincides with an arrangement order of the plurality of products on a display shelf.

The recommended value display field 212 is aligned in a horizontal direction with the plan input field 210. Then, the first screen includes a copy button 214 for copying a recommended value to the plan input field 210. The copy button 214 is located between the recommended value display field 212 and the plan input field 210, and is provided by time period. Then, when a salesclerk selects the copy button 214, product names of a plurality of products and a recommended value of each of the products are collectively input to the plan input field 210 in a time period associated with the selected copy button 214.

Note that, a salesclerk in charge of cooking at the target store confirms the preparation plan being stored in the storage unit 140. At this time, the acquisition unit 110 acquires the preparation plan being stored in the storage processing unit 130. Then, the screen display unit 120 displays a confirmation screen of the preparation plan on the display 150 by using read information. Also, on this confirmation screen, similarly to the plan input field 210 in FIG. 4, a display field of the preparation number is provided by the plurality of time periods for each of the plurality of products. Then, in each of the time periods, an arrangement order of the display fields of the plurality of products coincides with the arrangement order of the plurality of products on a display shelf Thus, a salesclerk can easily determine a product associated with each display field. Thus, the salesclerk is less likely to mix up a preparation number of a product during cooking.

Figure 9:
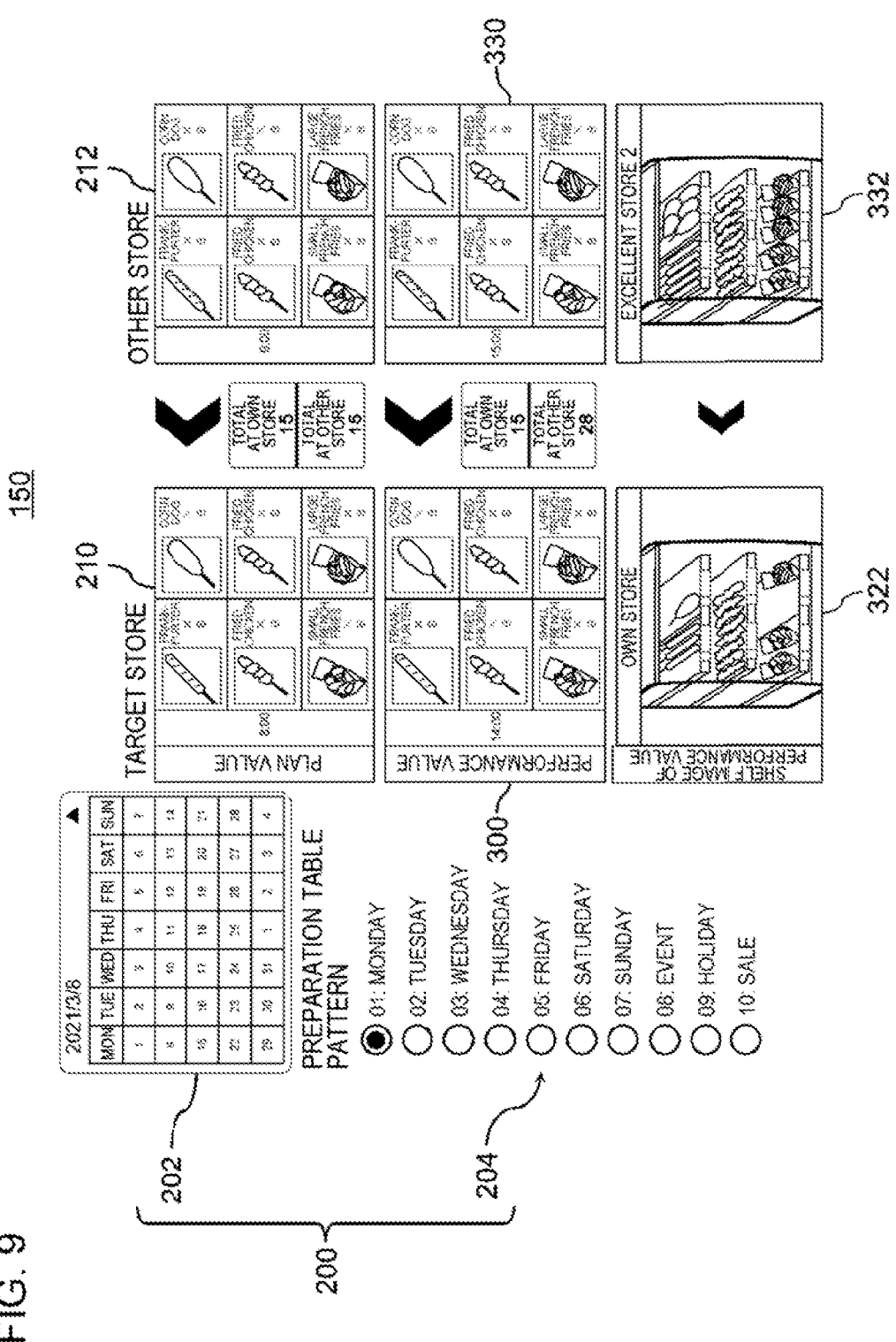
FIG. 9 It is a diagram illustrating a second example of the first screen displayed on the display 150 in step S30.

FIG. 9 is a diagram illustrating a second example of the first screen displayed on the display 150 in step S30. In the example illustrated in FIG. 9, target period information specifies both of a month and day and a time period. Then, the first screen includes a performance display field 300 and a shelf image display field 322 in addition to the plan input field 210.

The performance display field 330 indicates a performance value of a preparation number by plurality of products at the target store. The performance value is based on a performance value in a past period having the same attribute as that in a period indicated by the target period information. Then, an arrangement order of the performance values of the plurality of products coincides with the arrangement order of the plurality of products on a display shelf. In other words, an arrangement order of the product in the performance display field 300 coincides with an arrangement order of the product in the plan input field 210. Therefore, a salesclerk at the target store easily compares a performance value of a preparation number of a product with an input field of a preparation number of the product.

The shelf image display field 322 displays an image of the display shelf on which the plurality of products are displayed. The image being displayed herein is captured at the target store in a past period having the same attribute as that in a period indicated by the target period information. As described above, in each of the plan input field 210 and the performance display field 300, the arrangement order of the products coincides with the arrangement order of the plurality of products on the display shelf. Further, when a salesclerk at the target store confirms a target value and the performance value of the plurality of products, the salesclerk can refer to the image of the display shelf. Therefore, the salesclerk is less likely to mix up a product.

Note that, the first screen illustrated in FIG. 9 includes the performance display field 330 and a shelf image display field 332 at another store being a basis of a recommended value in addition to the recommended value display field 212. Data displayed in the performance display field 330 and the shelf image display field 332 are similar to data displayed in the performance display field 300 and the shelf image display field 322 except for a point that a target is the another store.

Figure 5:
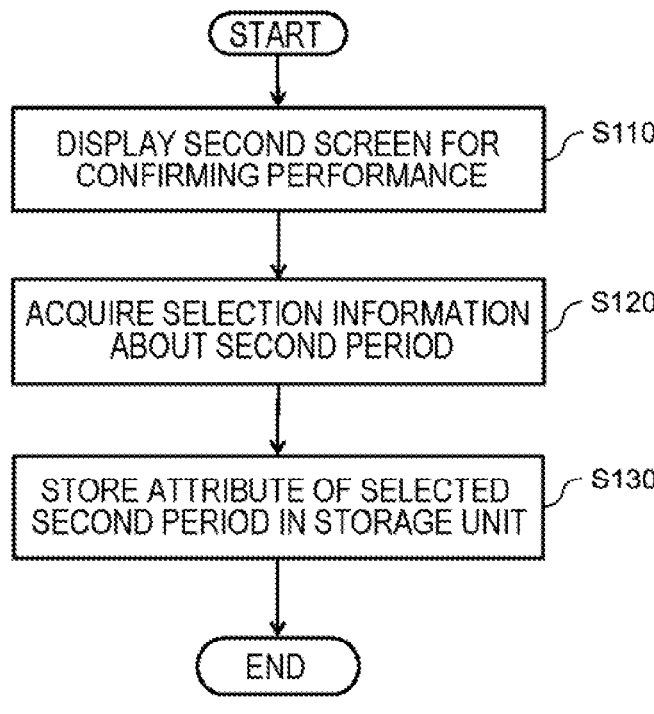
FIG. 5 It is a flowchart illustrating a second example of processing performed by the product management apparatus 10.

FIG. 5 is a flowchart illustrating a second example of processing performed by the product management apparatus 10. When the processing illustrated in FIG. 5 is performed, a salesclerk at a target store confirms, by using the product management apparatus 10, at least one piece of performance of a preparation number, a sales number, and a disposal number of a product cooked in the store. Then, the salesclerk selects a period considered to need an improvement in the preparation number. Then, the product management apparatus 10 displays, in the period selection field 200 for selecting the target period information, the selected period in a different manner from that in another period. Further, when the product management apparatus 10 displays a first screen associated with the same attribute as that in the selected period, the product management apparatus 10 displays at least a part of the first screen in a different manner from that in a case of the another period.

First, the screen display unit 120 displays a second screen on the display 150. The second screen indicates at least one performance value (hereinafter, described as performance information) of a preparation number, a sales number, and a disposal number of a product at the target store by period (for example, by month and day) (step S110). Hereinafter, a period used on a first screen (i.e., a screen including an input field of a preparation number of a product) is described as a first period, and a period used on the second screen is described as a second period. The second period can be selected on the second screen. Note that, the performance information is stored in, for example, the storage unit 140. However, at least a part (for example, a sales number) of the performance information may be stored in an external apparatus, for example, a POS system.

A salesclerk at the target store uses the second screen, determines the second period that needs an improvement in a preparation number, and selects the determined second period. The storage processing unit 130 acquires information indicating the selected second period (step S120), and stores an attribute of the selected second period in the storage unit 140 (step S130).

Subsequently, the product management apparatus 10 displays, in the period selection field 200 for selecting the target period information, the selected period in a different manner from that in another period. Furthermore, when a first period associated with the same attribute as that of the selected second period is selected, the product management apparatus 10 displays at least a part of a first screen in a different manner from that in an associated portion of the first screen when another first period is selected.

Figure 6:
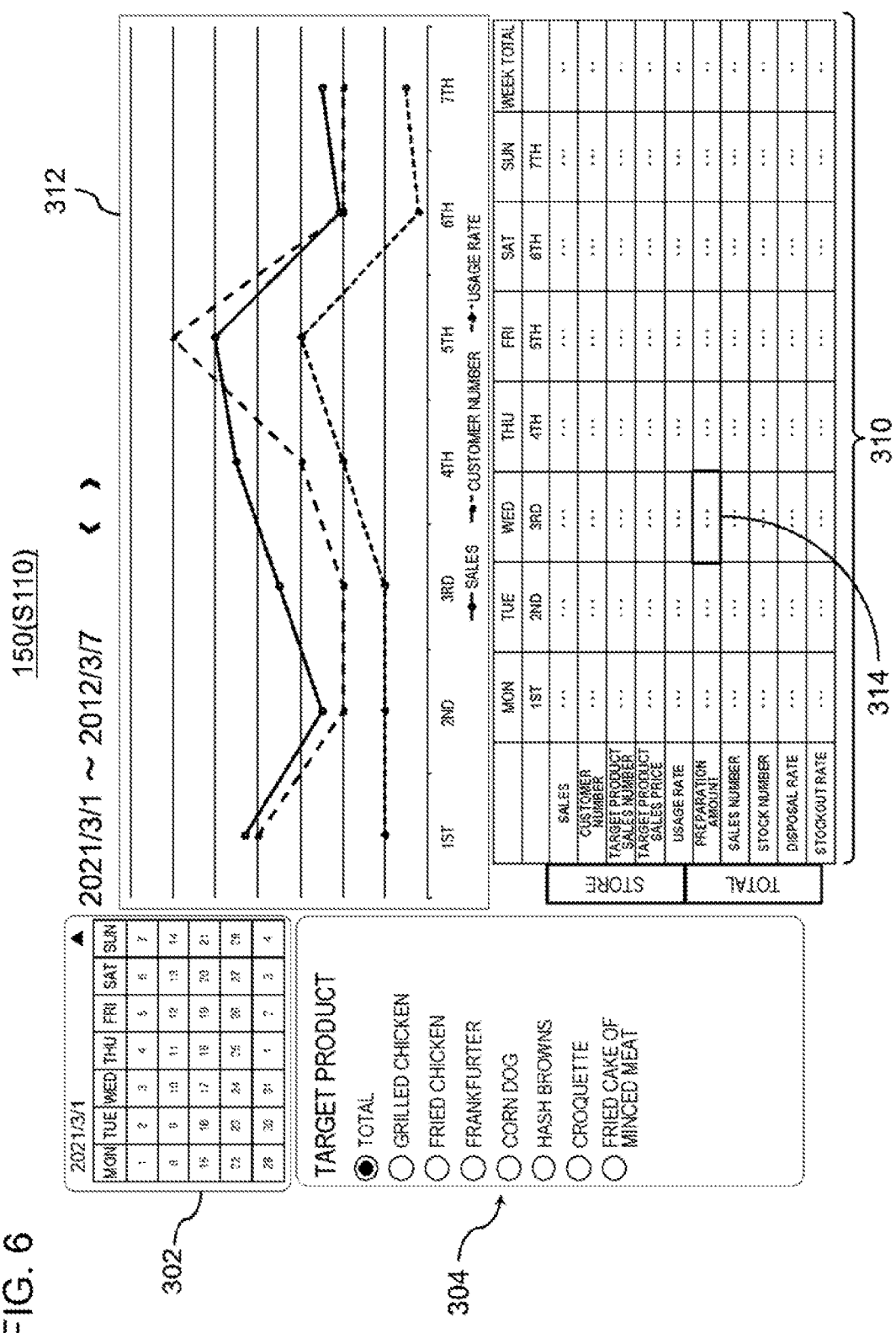
FIG. 6 It is a diagram illustrating one example of a second screen displayed by the display in step S110 in FIG. 5.

FIG. 6 is a diagram illustrating one example of the second screen displayed by the display 150 in step S110 in FIG. 5.

As described by using FIG. 5, the second screen indicates performance information at a target store by period (for example, by month and day). In the example illustrated in FIG. 6, the second screen includes a period selection field 302 for selecting a second period. As described by using FIG. 5, the second period is a period that needs an improvement in a preparation number. A month and day can be selected in the period selection field 302. Further, the second screen includes a product selection field 304 for selecting a product whose performance information needs to be displayed.

Further, the second screen includes a table region 310 that displays, in a table form, performance information about a product selected in the product selection field 304 in a second period selected in the period selection field 302, and a graph region 312 that displays the performance information in a graph. Note that, in the table region 310 and the graph region 312, a period in which the performance information is displayed includes a month and day selected in the period selection field 302, and a month and day before and after the selected month and day. As one example, a period in which the performance information is displayed is a week including a month and day selected in the period selection field 302.

Then, in at least one (preferably both) of the table region 310 and the graph region 312, each month and day can be selected as a second period whose attribute needs to be stored. The storage processing unit 130 stores, in the storage unit 140, an attribute associated with a period selected in the table region 310 or the graph region 312. For example, in the table region 310 in FIG. 6, a preparation amount field in a specific month and day (for example, March 3$^{rd}$) is selected by a salesclerk. Then, this field (for example, a field indicated by a reference sign 314) is emphasized and displayed. Further, the storage processing unit 130 stores an attribute associated with this month and day in the storage unit 140. At this time, the storage processing unit 130 may further store, in the storage unit 140, information (hereinafter, described as product identification information) that identifies a product selected in the product selection field 304.

Further, the month and day is set as the second period on the second screen, but this month and day may be further subdivided into a plurality of time periods (for example, morning, afternoon, and night). In this case, performance information is also displayed by plurality of time periods. The plurality of time periods can be selected. In this case, a salesclerk may select at least one time period in addition to the month and day. The selected time period is a time period that needs an improvement in a preparation number. Then, the storage processing unit 130 also further stores, in addition to the attribute associated with this month and day, information (hereinafter, described as time period information) indicating the selected time period in the storage unit 140.

Figure 7:
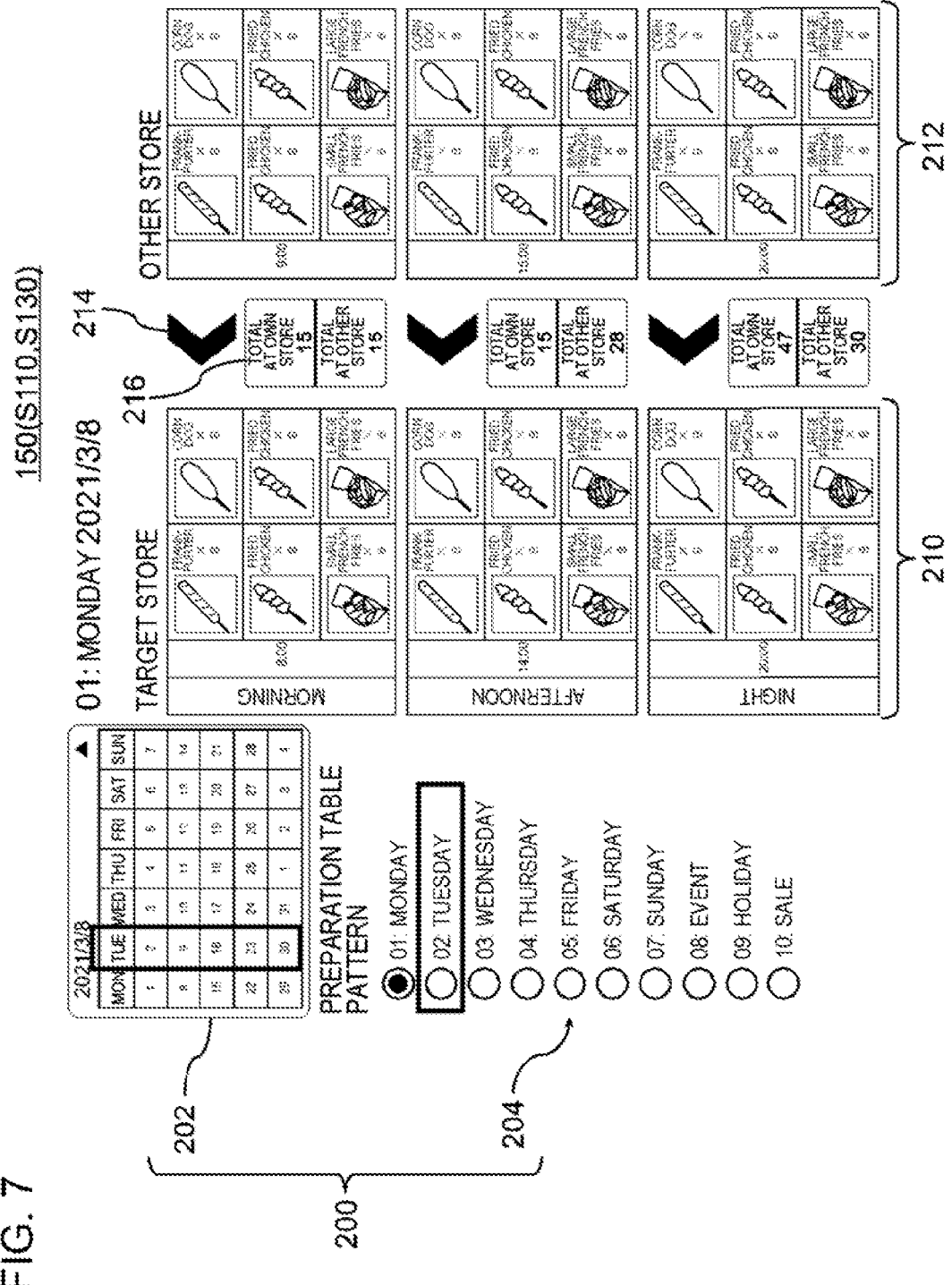
FIG. 7 It is a diagram illustrating a first example of a first screen after a salesclerk selects a second period.

FIG. 7 is a diagram illustrating a first example of a first screen (i.e., a screen including an input field of a preparation number of a product) after a salesclerk selects a second period that needs an improvement in a preparation number on the screen illustrated in FIG. 6. In the example illustrated in FIG. 7, the screen display unit 120 recognize, by using information being stored in the storage unit 140, an attribute (for example, Tuesday) of the second period (i.e., the period that needs the improvement in the preparation number) selected by the salesclerk. Then, the screen display unit 120 displays, in the period selection field 200 on the display 150, a period (for example, a date and time in the month-day selection field 202, and an attribute in the attribute selection field 204) associated with the recognized attribute in a different manner from that in another period. The display performed herein is emphasized display, and is performed by, for example, setting a different color, thickening a character and a frame line, providing a specific mark, and/or the like. In this way, a salesclerk can recognize a period (for example, a day of a week) that needs an improvement in a preparation number.

Note that, in the example illustrated in FIG. 7, a period being selected as a first period has an attribute different from that of the second period selected by the salesclerk. Thus, the plan input field 210 is as normal.

Figure 8:
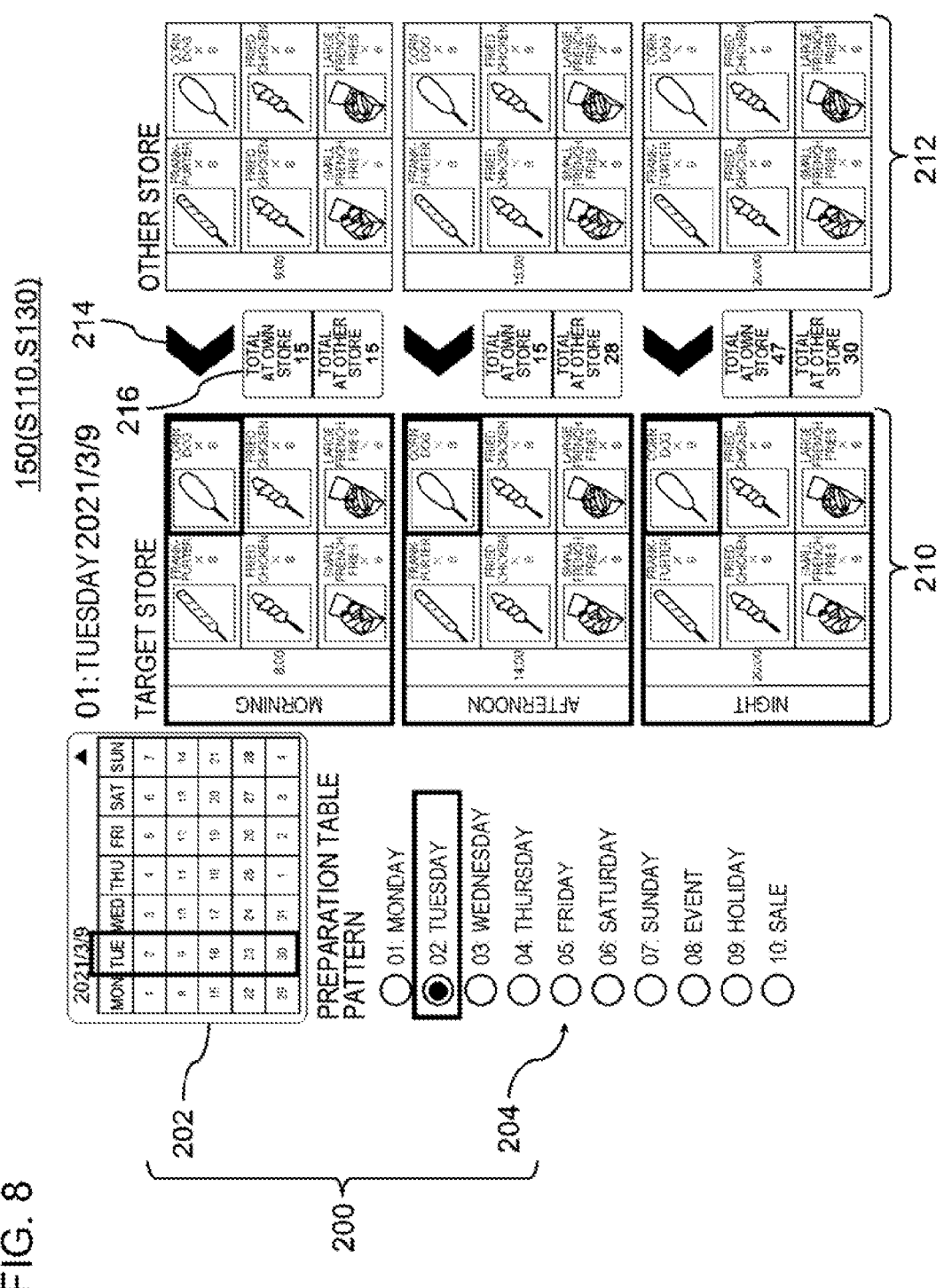
FIG. 8 It is a diagram illustrating a second example of the first screen after the salesclerk selects the second period.

FIG. 8 is a diagram illustrating a second example of the first screen (i.e., the screen including the input field of the preparation number of the product) after the salesclerk selects the second period that needs the improvement in the preparation number on the screen illustrated in FIG. 6. On the first screen illustrated in FIG. 8, a period (for example, Tuesday, March $9^{th}$) being selected as a first period has the same attribute (for example, Tuesday) as that of the second period selected by the salesclerk. Thus, the plan input field 210 is displayed in a different manner from that in the example illustrated in FIG. 7. The display performed herein is also emphasized display, and is performed by, for example, setting a different color, thickening a character and a frame line, providing a specific mark, and/or the like. In this way, a salesclerk can recognize that a preparation number of a product needs to be improved in a period in which the salesclerk is about to input a preparation number this time.

Further, when the storage unit 140 also stores at least one of product identification information and time period information (for example, morning, afternoon, or evening) about a product that needs an improvement in a preparation number, the screen display unit 120 reads the pieces of information from the storage unit 140. Then, when the read information includes the product identification information, the screen display unit 120 displays, in the plan input field 210, an input field (for example, an input field on the upper right) associated with the product identification information read from the storage unit 140 in a different manner from that in another input field. Further, when a first period is in a unit of days, and the read information includes the time period information, the screen display unit 120 displays, in the plan input field 210, an input field associated with the time period information read from the storage unit 140 in a different manner from that in another input field. Further, when a first period is in a unit of days, and the read information includes both of the product identification information and the time period information, the screen display unit 120 displays, in the plan input field 210, an input field associated with a combination of the product identification information and the time period information read from the storage unit 140 in a different manner from that in another input field. The display performed herein is also emphasized display, and is performed by, for example, setting a different color, thickening a character and a frame line, providing a specific mark, and/or the like. In this way, a salesclerk can easily recognize at least one of a product and a time period that need an improvement in a preparation number.

As described above, according to the present invention, a possibility that, when a salesclerk sets a preparation number of a product cooked in a store, the salesclerk makes a mistake in a product being an input target is reduced. Further, a salesclerk can easily recognize a period that needs an improvement in a preparation number.

While the example embodiments of the present invention have been described with reference to the drawings, the example embodiments are only exemplification of the present invention, and various configurations other than the above-described example embodiments can also be employed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. A product management apparatus including:
   an acquisition unit that acquires target period information that can determine a first period being a setting target of a preparation plan of a product cooked at a target store;
   a screen display unit that displays, on a display, a first screen including an input field of a preparation number of the product by a plurality of kinds of the products; and
   a storage processing unit that stores, in a storage unit, a numerical value input to the input field, in association with a combination of the product associated with the input field and a period indicated by the target period information, wherein
   two or more of the products are displayed on one display shelf in the target store, and
   an arrangement order of the input field associated with each of the two or more products on the first screen is a same as an arrangement order of the two or more products on the display shelf.

2. The product management apparatus according to supplementary note 1 described above, wherein
   at least one of the input fields includes at least one of an image, a picture, and a mark of the product associated with the input field.

3. The product management apparatus according to supplementary note 1 or 2 described above, wherein
   the first screen includes a recommended value of a preparation number of at least one of the products.

4. The product management apparatus according to supplementary note 3 described above, wherein
   the recommended value is based on a performance value of a preparation number of the product at a store different from the target store.

5. The product management apparatus according to any one of supplementary notes 1 to 4 described above, wherein
   the first period has an attribute, and
   the attribute includes at least one of a day of a week, whether it is a holiday, presence or absence of a sale at the target store, and presence or absence of an event around the target store.

6. The product management apparatus according to supplementary note 5 described above, wherein
   the screen display unit displays, on a display, a second screen indicating at least one performance value of a preparation number, a sales number, and a disposal number of the product at the target store by second period, the second period has the attribute, the second period can be selected on the second screen, the storage processing unit stores, in the storage unit, the attribute of the second period selected on the second screen, and, before the acquisition unit acquires the target period information, the screen display unit selectably displays a plurality of the first periods, determines the attribute of the second period stored in the storage unit, and displays, on the display, the first period associated with the attribute in a different manner from that in another of the first periods.

7. The product management apparatus according to supplementary note 5 described above, wherein the screen display unit displays, on a display, a second screen indicating at least one performance value of a preparation number, a sales number, and a disposal number of the product at the target store by second period, the second period has the attribute, the second period can be selected on the second screen, the storage processing unit stores, in the storage unit, the attribute of the second period selected on the second screen, and, when the attribute of the first period, and the attribute of the second period stored in the storage unit coincide with each other, the screen display unit displays, on the display, the input field associated with the first period in a different manner from that in a case where the two attributes do not coincide with each other.

8. The product management apparatus according to supplementary note 7 described above, wherein the second period is a month and day, at least one time period can be selected from a plurality of time periods during a day on the second screen, the storage processing unit stores, in the storage unit, a time period selected on the second screen together with the attribute, on the first screen, a first period is in a unit of days and the input field is provided by the plurality of time periods, and the screen display unit displays, in the different manner on the display, the input field associated with the time period being stored in the storage unit of the input field associated with the first period.

9. A product management apparatus including:

an acquisition unit that acquires information indicating a preparation number of each of a plurality of kinds of products cooked at a target store; and a screen display unit that displays, on a display, a screen including a display field of a preparation number of the product by the plurality of kinds of products, wherein two or more of the products are displayed on one display shelf in the target store, and an arrangement order of the display field associated with each of the two or more products on the screen is a same as an arrangement order of the two or more products on the display shelf.

10. A product management method including, by a computer executing:

acquisition processing of acquiring target period information that can determine a first period being a setting target of a preparation plan of a product cooked at a target store;

screen display processing of displaying, on a display, a first screen including an input field of a preparation number of the product by a plurality of kinds of the products; and storage processing of storing, in a storage unit, a numerical value input to the input field, in association with a combination of the product associated with the input field and a period indicated by the target period information, wherein two or more of the products are displayed on one display shelf in the target store, and an arrangement order of the input field associated with each of the two or more products on the first screen is a same as an arrangement order of the two or more products on the display shelf.

11. The product management method according to supplementary note 10 described above, wherein at least one of the input fields includes at least one of an image, a picture, and a mark of the product associated with the input field.

12. The product management method according to supplementary note 10 or 11 described above, wherein the first screen includes a recommended value of a preparation number of at least one of the products.

13. The product management method according to supplementary note 12 described above, wherein the recommended value is based on a performance value of a preparation number of the product at a store different from the target store.

14. The product management method according to any one of supplementary notes 10 to 13 described above, wherein the first period has an attribute, and the attribute includes at least one of a day of a week, whether it is a holiday, presence or absence of a sale at the target store, and presence or absence of an event around the target store.

15. The product management method according to supplementary note 14 described above, further including, by the computer, in the screen display processing, displaying, on a display, a second screen indicating at least one performance value of a preparation number, a sales number, and a disposal number of the product at the target store by second period, wherein the second period has the attribute, and the second period can be selected on the second screen, the product management method further including, by the computer:

in the storage processing, storing, in the storage unit, the attribute of the second period selected on the second screen; and, before the target period information is acquired in the acquisition processing, in the screen display processing, selectably displaying a plurality of the first periods, determining the attribute of the second period stored in the storage unit, and displaying, on the display, the first period associated with the attribute in a different manner from that in another of the first periods.

16. The product management method according to supplementary note 14 described above, further including, by the computer, in the screen display processing, displaying, on a display, a second screen indicating at least one performance value of a preparation number, a sales number, and a disposal number of
the product at the target store by second period,
wherein
the second period has the attribute, and
the second period can be selected on the second screen,
the product management method further including, by
the computer:
in the storage processing, storing, in the storage unit,
the attribute of the second period selected on the
second screen; and,
in the screen display processing, when the attribute
of the first period, and the attribute of the second
period stored in the storage unit coincide with
each other, displaying, on the display, the input
field associated with the first period in a different
manner from that in a case where the two attri-
butes do not coincide with each other.
17. The product management method according to
supplementary note 16 described above, wherein
the second period is a month and day, and
at least one time period can be selected from a plurality
of time periods during a day on the second screen,
the product management method further including,
by the computer, in the storage processing,
storing, in the storage unit, a time period selected on
the second screen together with the attribute,
wherein
on the first screen, a first period is in a unit of days and
the input field is provided by the plurality of time
periods,
the product management method further including,
by the computer, in the screen display processing,
displaying, in the different manner on the display, the
input field associated with the time period being
stored in the storage unit of the input field asso-
ciated with the first period.
18. A product management method including,
by a computer executing:
acquisition processing of acquiring information indi-
cating a preparation number of each of a plurality of
kinds of products cooked at a target store; and
screen display processing of displaying, on a display, a
screen including a display field of a preparation
number of the product by the plurality of kinds of
products, wherein
two or more of the products are displayed on one
display shelf in the target store, and
an arrangement order of the display field associated
with each of the two or more products on the screen
is a same as an arrangement order of the two or more
products on the display shelf.
19. A program causing a computer to include:
an acquisition function of acquiring target period infor-
mation that can determine a first period being a
setting target of a preparation plan of a product
cooked at a target store;
a screen display function of displaying, on a display, a
first screen including an input field of a preparation
number of the product by a plurality of kinds of the
products; and
a storage processing function of storing, in a storage
unit, a numerical value input to the input field, in
association with a combination of the product asso-
ciated with the input field and a period indicated by
the target period information, wherein
two or more of the products are displayed on one
display shelf in the target store, and

an arrangement order of the input field associated with
each of the two or more products on the first screen
is a same as an arrangement order of the two or more
products on the display shelf.
20. The program according to supplementary note 19
described above, wherein
at least one of the input fields includes at least one of
an image, a picture, and a mark of the product
associated with the input field.
21. The program according to supplementary note 19 or
20 described above, wherein
the first screen includes a recommended value of a
preparation number of at least one of the products.
22. The program according to supplementary note 21
described above, wherein
the recommended value is based on a performance
value of a preparation number of the product at a
store different from the target store.
23. The program according to any one of supplementary
notes 19 to 22 described above, wherein
the first period has an attribute, and
the attribute includes at least one of a day of a week,
whether it is a holiday, presence or absence of a sale
at the target store, and presence or absence of an
event around the target store.
24. The program according to supplementary note 23
described above, wherein
the screen display function displays, on a display, a
second screen indicating at least one performance
value of a preparation number, a sales number, and
a disposal number of the product at the target store
by second period,
the second period has the attribute,
the second period can be selected on the second screen,
the storage processing function stores, in the storage
unit, the attribute of the second period selected on the
second screen, and,
before the acquisition function acquires the target
period information, the screen display function
selectably displays a plurality of the first periods,
determines the attribute of the second period
stored in the storage unit, and displays, on the
display, the first period associated with the attri-
bute in a different manner from that in another of
the first periods.
25. The program according to supplementary note 23
described above, wherein
the screen display function displays, on a display, a
second screen indicating at least one performance
value of a preparation number, a sales number, and
a disposal number of the product at the target store
by second period,
the second period has the attribute,
the second period can be selected on the second screen,
the storage processing function stores, in the storage
unit, the attribute of the second period selected on the
second screen, and,
when the attribute of the first period, and the attribute
of the second period stored in the storage unit
coincide with each other, the screen display function
displays, on the display, the input field associated
with the first period in a different manner from that
in a case where the two attributes do not coincide
with each other.
26. The program according to supplementary note 25
described above, wherein
the second period is a month and day,

at least one time period can be selected from a plurality of time periods during a day on the second screen, the storage processing function stores, in the storage unit, a time period selected on the second screen together with the attribute, on the first screen, a first period is in a unit of days and the input field is provided by the plurality of time periods, and the screen display function displays, in the different manner on the display, the input field associated with the time period being stored in the storage unit of the input field associated with the first period.

27. A program causing a computer to include:

an acquisition function of acquiring information indicating a preparation number of each of a plurality of kinds of products cooked at a target store; and a screen display function of displaying, on a display, a screen including a display field of a preparation number of the product by the plurality of kinds of products, wherein two or more of the products are displayed on one display shelf in the target store, and an arrangement order of the display field associated with each of the two or more products on the screen is a same as an arrangement order of the two or more products on the display shelf.

REFERENCE SIGNS LIST

10 Product management apparatus
110 Acquisition unit
120 Screen display unit
130 Storage processing unit
140 Storage unit
150 Display

What is claimed is:

1. A product management apparatus comprising:

at least one memory configured to store one or more instructions; and at least one processor configured to execute the one or more instructions to:

acquire target period information that can determine a preparation time of a product cooked at a target store;

display, on a display, a first screen including a plurality of products including the product, and an input field of a number of the product to be prepared; and store, in a storage, a numerical value input to the input field, in association with a combination of the product associated with the input field and a period indicated by the target period information, wherein the plurality of products are displayed on a display shelf in the target store, an arrangement order of the input field associated with each of the plurality of products on the first screen is a same as an arrangement order of the plurality of products on the display shelf, the preparation time is based on an attribute including at least one of a day of a week, whether it is a holiday, presence or absence of a sale at the target store, and presence or absence of an event around the target store, wherein the at least one processor is further configured to execute the one or more instructions to:

display, on the display, a second screen indicating at least one performance value of a preparation number, a sales number, and a disposal number of the product at the target store by a second period having the attribute and being selectable on the second screen,

store, in the storage, the attribute of the second period selected on the second screen, and, before acquiring the target period information, selectably display a plurality of first periods, determine the attribute of the second period stored in the storage, and display, on the display, the first period associated with the attribute in a different manner from other of the plurality of first periods.

2. The product management apparatus according to claim 1, wherein the input field includes at least one of an image, a picture, and a mark of the product associated with the input field.

3. The product management apparatus according to claim 1, wherein the first screen includes a recommended value of the number of the product to be prepared.

4. The product management apparatus according to claim 3, wherein the recommended value is based on a performance value of the number of the product to be prepared at a store different from the target store.

5. The product management apparatus according to claim 1, wherein the at least one processor is further configured to execute the one or more instructions to:

when the attribute of the first period, and the attribute of the second period stored in the storage coincide with each other, display, on the display, the input field associated with the first period in a different manner from a case where the attribute of the first period and the attribute of the second period do not coincide with each other.

6. The product management apparatus according to claim 5, wherein the second period is a month and a day, at least one time period can be selected from a plurality of time periods during a day on the second screen, the at least one processor is further configured to execute the one or more instructions to store, in the storage, a time period selected on the second screen, together with the attribute, on the first screen, a first period is in a unit of days and the input field is provided by the plurality of time periods, and the at least one processor is further configured to execute the one or more instructions to display, in the different manner on the display, the input field associated with the time period being stored in the storage of the input field associated with the first period.

7. A product management method comprising, by a computer executing:

acquiring target period information that can determine a preparation time of a product cooked at a target store;

displaying, on a display, a first screen including a plurality of products including the product, and an input field of a number of the product to be prepared; and storing, in a storage, a numerical value input to the input field, in association with a combination of the product associated with the input field and a period indicated by the target period information, wherein the plurality of products are displayed on a display shelf in the target store, an arrangement order of the input field associated with each of the plurality of products on the first screen is a same as an arrangement order of the plurality of products on the display shelf, the preparation time is based on an attribute including at least one of a day of a week, whether it is a holiday, presence or absence of a sale at the target store, and presence or absence of an event around the target store, and wherein the computer further executing:

display, on the display, a second screen indicating at least one performance value of a preparation number, a sales number, and a disposal number of the product at the target store by a second period having the attribute and being selectable on the second screen, store, in the storage, the attribute of the second period selected on the second screen, and, before acquiring the target period information, selectably display a plurality of first periods, determine the attribute of the second period stored in the storage, and display, on the display, the first period associated with the attribute in a different manner from other of the plurality of first periods.

8. A non-transitory storage medium storing a program causing a computer to:

acquire target period information that can determine a preparation time of a product cooked at a target store;

display, on a display, a first screen including a plurality of products including the product, and an input field of a number of the product to be prepared; and store, in a storage, a numerical value input to the input field, in association with a combination of the product associated with the input field and a period indicated by the target period information, wherein the plurality of products are displayed on a display shelf in the target store, an arrangement order of the input field associated with each of the plurality of products on the first screen is a same as an arrangement order of the plurality of products on the display shelf, the preparation time is based on an attribute including at least one of a day of a week, whether it is a holiday, presence or absence of a sale at the target store, and presence or absence of an event around the target store, wherein the program further causing the computer to:

display, on the display, a second screen indicating at least one performance value of a preparation number, a sales number, and a disposal number of the product at the target store by a second period having the attribute and being selectable on the second screen, store, in the storage, the attribute of the second period selected on the second screen, and, before acquiring the target period information, selectably display a plurality of first periods, determine the attribute of the second period stored in the storage, and display, on the display, the first period associated with the attribute in a different manner from other of the plurality of first periods.

\* \* \* \* \*